June 29, 1965  R. G. M. DE GARMO  3,192,379
SWIMMING POOL LIGHTING FIXTURE
Filed June 12, 1962  2 Sheets-Sheet 1
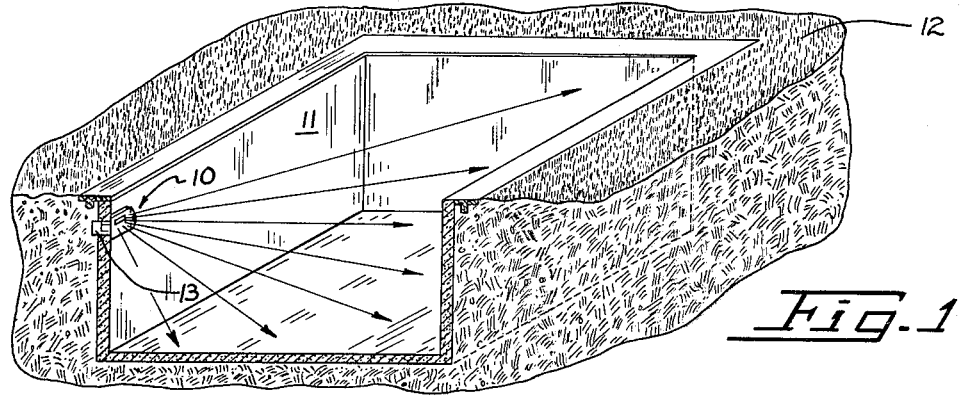
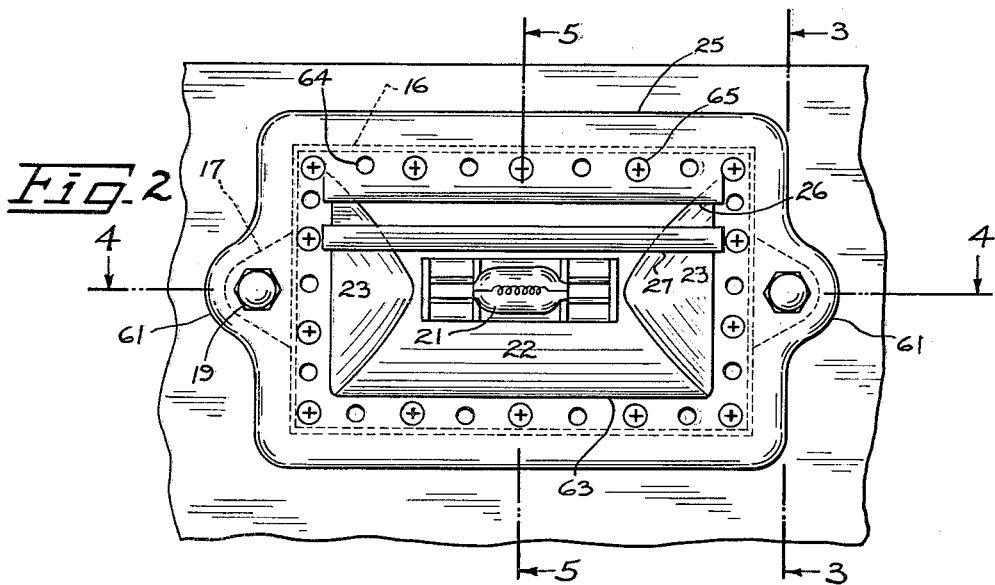
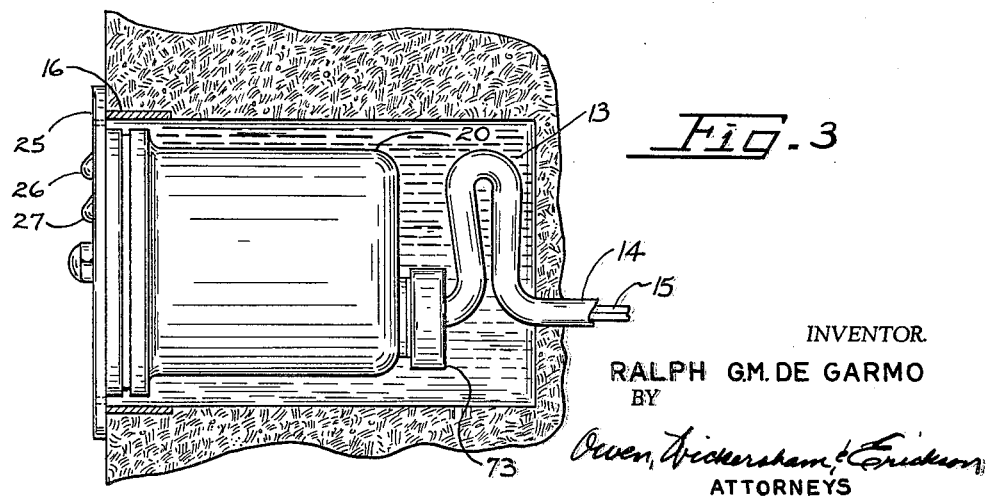
INVENTOR.
RALPH G.M. DE GARMO
BY
Owen, Wickersham & Erickson
ATTORNEYS

INVENTOR
RALPH G.M. DE GARMO
BY
ATTORNEYS

United States Patent Office 3,192,379
Patented June 29, 1965

3,192,379
SWIMMING POOL LIGHTING FIXTURE
Ralph G. M. De Garmo, San Francisco, Calif., assignor to Casella Lighting Co., San Francisco, Calif., a corporation of California
Filed June 12, 1962, Ser. No. 201,972
2 Claims. (Cl. 240—26)

This invention relates generally to lighting fixtures and more particularly it relates to an improved illumination device for lighting a swimming pool below its water line.

Most swimming pools, particularly those located outdoors, require some form of artificial illumination below the water line. Not only is such illumination necessary for safety purposes after daylight hours, but underwater lighting also serves to beautify the pool at night time.

There has long been a need for a safe and reliable swimming pool lighting fixture and yet one that is capable of producing high intensity illumination in the pool under the surface of the water without also producing a glare above the pool surface. As a means of reducing the inherent safety hazard of pool lighting systems it is essential that they be operable by a low voltage power source. This requirement is fulfilled in the present invention by a unique lighting fixture adapted to utilize relatively small but high intensity light bulbs that operate in the 8–30 volt range. Such light bulbs as, for example, the recently developed quartz type bulbs, are commercially available and are not themselves a part of the present invention. However, a broad object of my invention is to provide an underwater lighting fixture capable of utilizing such small, high intensity light bulbs and which will, in combination therewith provide a vastly improved quality of underwater lighting. In fulfilling this objective several problems connected with the use of such bulbs have been overcome. One problem with such bulbs for example, is that they produce a large amount of heat which must be dissipated. In the present invention the heat dissipation problem has been solved by means of a novel structure that enables the pool water to be utilized as a cooling medium, thus making the installation of a high intensity light source completely safe in its operation and also capable of a long operational life.

Another object of my invention is to provide an underwater light fixture for a swimming pool which provides illumination of a relatively high intensity below the water level and yet which does not produce a glare that is visible from any point outside the pool. This is an extremely important feature because such above-water glare, that is common in prior art fixtures, makes it difficult to see clearly around the pool apron, thus creating a safety hazard as well as greatly impairing the appearance of the lighted pool.

Another object of the present invention is to provide an underwater light fixture for a swimming pool that will produce a uniform distribution of underwater illumination and one that can be readily removed from the wall of the pool and serviced without lowering the water level of the pool.

Another object of the invention is to provide a light fixture adapted for installation below the water line of a pool that is unusually small and compact, requires a minimal amount of excavation to enable it to be flush mounted along the side wall of the pool.

A further object of the invention is to provide a light fixture for swimming pools that is easy to install and which can be readily removed for servicing when required.

Still another object of the invention is to provide an underwater light fixture for a swimming pool adaptable for use in combination with a relatively small sized bulb of high lumen output and having means for cooling the bulb with water from the swimming pool.

Another object of the invention is to provide an underwater light fixture of the aforementioned type that is safe and reliable and will not short circuit when installed or after a long period of use.

Another object of the invention is to provide an underwater light fixture made up of a combination of elements having a particular ease of assembly and economy of manufacture.

Other objects, advantages, and features of my invention will become apparent from the following detailed description of one embodiment thereof presented in accordance with 35 U.S.C. 112.

In the drawings:

FIG. 1 is a view in perspective and in section of a swimming pool showing a typical installation of an underwater light fixture embodying the principles of the invention;

FIG. 2 is a view in front elevation of the light fixture shown in FIG. 1;

FIG. 3 is a view in side elevation and in section taken along the line 3—3 in FIG. 2;

In FIG. 1 a light fixture 10 embodying the principles of the invention is shown in a typical installation within a wall 11 of a swimming pool 12. The fixture 10 provides for underwater illumination of unusually high intensity and only one is normally required in any standard home type pool or even in larger pools. As shown, the fixture 10 may be installed from one to four feet below the water line and within a cavity 13 formed in a pool wall at any desired location on the pool's perimeter.

Figure 4:
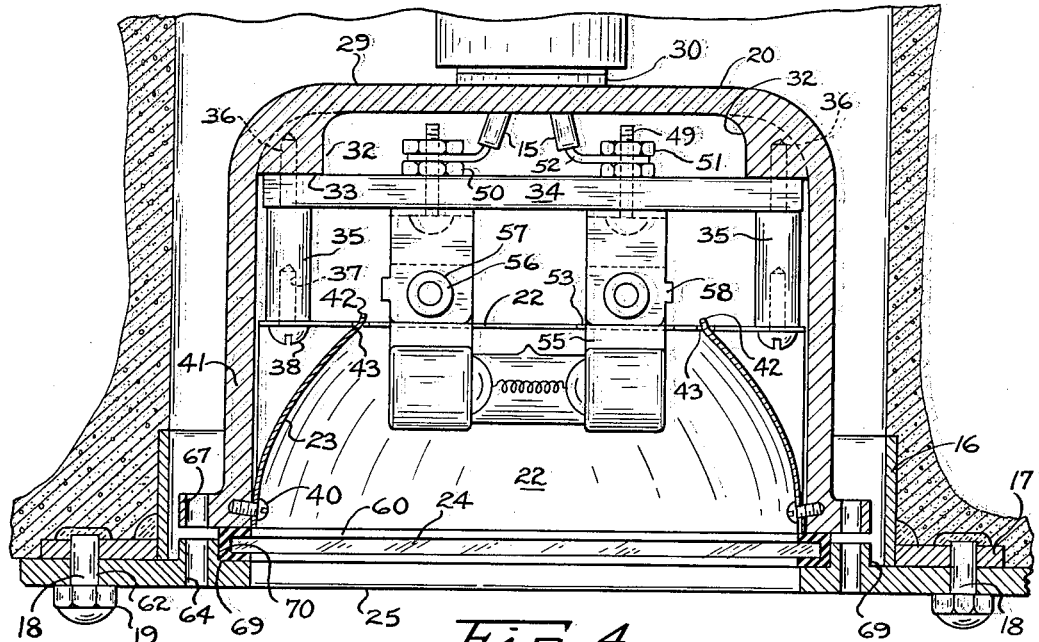
FIG. 4 is a somewhat enlarged plan view in section of the light fixture according to the invention and taken along the line 4—4 of FIG. 2.
Figure 5:
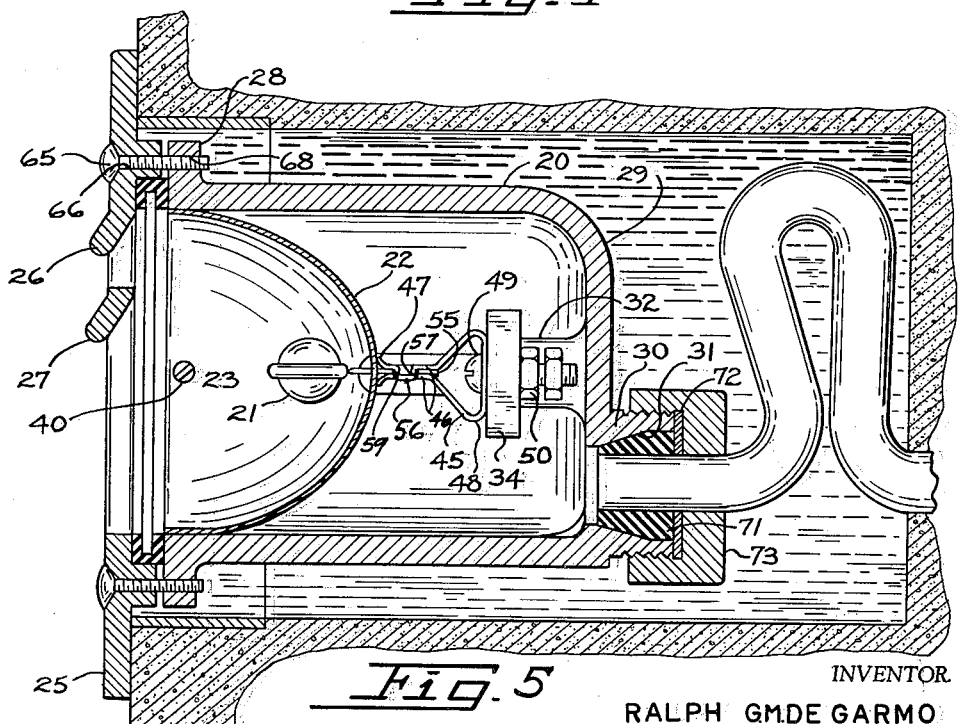
FIG. 5 is an enlarged view in side elevation showing details of the light fixture and taken along the line 5—5 of FIG. 2.

The cavity 13 can be lined in concrete or tile or some similar material and extending into it (as shown in FIGS. 3–5) is an electrical conduit 14 comprising an outer layer of water-proof insulation and a pair of wires 15 supplying a relatively low voltage current (i.e. 8–30 volts).

Embedded in the pool wall and extending around the open mouth of the cavity 13 is a mounting frame 16 consisting of a strip of stainless steel or brass whose edge is flush with the surface of the pool wall 11. Attached to the side portions of the mounting frame 16 and also preferably embedded in the pool wall are a pair of mounting brackets 17 each of which is provided with a fixed threaded stud 18 that extends outwardly from the pool wall 11.

Broadly speaking, the fixture 10, according to the invention, comprises a housing 20 in which is mounted a removable light bulb 21 and an adjacent reflector device composed of two members 22 and 23 that diverge away from the bulb 21 toward the open front of the housing. The light bulb 21 is small and operates at a low voltage while producing a high degree of illumination. The open front of the housing 20 is covered by a lens 24 that is substantially flush with the pool wall 11 and which is held in place by a cover member 25 having a pair of louvered light-deflecting bars 26 and 27 that are so positioned that they prevent the filament of the light bulb 21 from being visible to persons outside the pool.

The housing 20 is preferably cast as an integral member from some suitable non-corrosive material such as bronze, and around its front open side it has an outwardly extending flange 28 around its perimeter. Extending from the rear side 29 of the housing 20 is an externally threaded boss member 30 having a tapered, inwardly-diverging opening 31 extending into the housing 20. On the inside of the rear side wall of the housing 20 are a pair of spaced apart integral boss members 32 each having a flat mounting surface 33 adapted to support thereon a horizontally extending socket plate 34. The socket plate 34 is preferably made from some non-conducting material such as a laminated plastic and it serves to support both the light bulb 21 and its reflector 22. The socket plate 34 is held tightly against the boss member 32 by a pair of stud members 35. The stud members 35 have threaded end portions 36 of a reduced diameter that extend through the socket plate 34 near its opposite ends and are rigidly secured within a pair of tapped holes in the boss members 32. The unthreaded portion of each stud 35 has a predetermined length with an internally threaded end opening 37. A first reflector member 22 having a vertical parabolic cross section is fixed to the stud members 35 and hence to the housing 20 by means of a pair of screws 38 that are threaded into the tapped end openings 37 of the stud members 35. This member 22 reflects the light from the bulb 21 and controls the size of the beam therefrom in a vertical plane.

A pair of side reflector members 23 control the direction of the reflected light in the horizontal plane and are shaped to fit within the first reflector member 22. Each member 23 is attached by a screw 40 to the side walls 41 of the housing 20 near its mouth and together they extend inwardly and diverge from the mouth of the housing within the curvature of the first reflector 22 and along a generally parabolic line of curvature. As shown in FIG. 4, each side reflector member is provided with a tab member 42 at its inner extremity which is adapted to fit within an opening 43 in the first reflector member 22, thus securing the side reflectors 23 in position. All of the reflector members 22 and 23 are preferably made of some light metal material such as aluminum and are provided with a highly light reflective surface.

Located between the stud members 35 on the socket plate 34 are a pair of spaced apart female clip members 45 for retaining the light bulb 21. As shown in FIG. 5, the clips 45 in cross section each have a pair of contact arms 46 that are urged constantly together by the inherent spring tension of the clip to form a gripping jaw. The ends 47 of the contact arms 46 on each clip 45 may be flared outwardly to facilitate the insertion of the light bulb 21. At its opposite end each clip 45 has a looped portion 48 that is rigidly secured by a screw 49 and a first nut 50 to the socket plate 34. A second nut 51 is attached to each screw 49 and is taken up toward the first nut 50 to retain a contact member 52 on the end of each supply wire 15. The clips 45 extend parallel to each at substantially a right angle from the socket plate 34 and through a pair of spaced apart openings 53 in the first reflector 22.

As stated above, the light source utilized in my fixture 10 consists of a low voltage but relatively high lumen output light bulb 21 that provides light of high intensity. Generally, I prefer to use a quartz bulb of the type that is available commercially but heretofore used primarily on aircraft. Each bulb 21 is relatively small in diameter and at each end is provided with a flat, knife-like contact member 55 that is adapted to be inserted between and gripped by a pair of contact arms 46 of the clips 45 that are normally urged together by spring tension. One of the contact arms of each pair of arms 46 is provided with a dimple-like protuberance 56 that extends toward and is in register with a hole 57 in the immediately adjacent arm. The contact members 55 on the bulb 21 are each provided with a hole 59 that is slightly larger than the protuberance 56 so that when the contact members 55 are forced between the contact arms 46, the protuberances 56 will extend into the holes 59 and at least partially into the holes 57 to lock the bulb 21 firmly in position. This feature is extremely important because although the bulb 21 is easily removable, it is always maintained in a fixed predetermined position in proper focus relative to the reflectors 22 and 23. This assures the optimum in illumination efficiency from the fixture. Moreover, the firm locking grip on the bulb prevents any in or out movement and thus any inadvertent contact with current carrying elements that could result in a short circuit within the fixture.

In order to retain the maximum amount of reflective surface, the openings 53 in the reflector member 22 are kept small, and consequently the space around each clip 45 is limited. To further prevent any inadvertent contact between either of the light bulb contact members 55, and the reflector member 22 during the operation of the fixture, a pair of bent over positioning tabs 58 are provided on the clips 45. These limit the movement of the bulb contact arms 55 in a horizontal direction when installed and prevent any inadvertent short-circuiting contact. One of the advantages of using a low voltage system in accordance with the invention becomes apparent here, namely, that current carrying members when held firmly can be located close to other structure without the danger of arcing and causing a malfunction.

The cover member 25 for my fixture performs several important functions. For one thing it retains the housing 20 within the wall cavity 13 of the pool while simultaneously holding the lens 24 in position so that it completely covers the mouth of the housing 20. The lens 24, which is preferably of Pyrex sheet material, is sealed around the housing by a gasket 60 having a generally U-shaped cross section that fits over the edge of the lens 24 and extends completely around its perimeter. The gasket 60 may be made of any suitable resilient material, but I prefer to use a silicone rubber that is heat resistant to withstand the varying temperatures produced by the light fixture 10.

As shown, the cover member 25 has a generally rectangular shape and is also preferably made of bronze material with a layer of chrominum plating to improve its appearance. At its sides are provided a pair of ear portions 61 with holes 62 that are spaced apart to align with the studs 18 extending from the mounting frame 16.

A central opening 63 also having a rectangular shape is provided in the cover 25. Spaced around the opening and inwardly from its edge are a series of ports 64 through the cover. The cover member is secured to the outwardly extending flange 28 on the housing 20 by means of a number of machine screws 65 adapted to extend through a series of spaced apart threaded holes 66 located around the opening 63 and between the ports 64. The ports 64 and holes 66 in the cover 25 all register with a series of similar ports 67 and holes 68 in the housing flange 28 when these two members 20 and 25 are secured together. On the inner side of the cover 25 is a rectangular shaped ridge portion 69 through which the ports 64 and holes 66 extend and which forms a recessed shoulder 70 for retaining the lens 24 and its gasket 60. As the cover 25 is drawn up tight against the housing flange 28 it presses against the lens gasket 60 and confines it within the recess formed by the shoulder 70 thereby providing a fluid-tight seal between the lens 24 and the housing 20.

Across the central opening 63 of the cover member 25 are the fixed spaced apart louvers 26 and 27 that serve to deflect the light from the fixture 10 in the desired direction. The upper louver 26 extends horizontally and below the upper edge of the housing when the cover is attached thereto. Spaced below the upper louver 26 and parallel to it is the lower louver 27. The lower edge of the louver 27 lies just above a horizontal plane through the center axis of the bulb 21. The louvers are preferably cast as integral portions of the cover 25, and they extend outwardly and slant downwardly at a predetermined angle between them, their angle of downward slope, and their general location in the upper portion of the opening 63, they block any glaring view of the bulb filament to a person around the pool above the water line. Yet the louvers 26 and 27 do not interfere with the effective distribution of light in the pool beneath the water level.

As shown in FIGS. 4 and 5 the conduit 14 from the electrical supply source preferably is brought into the cavity 13 through its rear wall and into the housing 20 via the opening 31 in the boss member 30. The housing 20 is sealed around the conduit 14 by means of a rubber or neoprene bushing 71 that fits tightly around the conduit 14 and in the tapered opening 31. The bushing 71 is held snugly in place by a washer 72 secured by an internally threaded nut 73 that fits around the conduit and is connected to the boss 30.

Aside from its aforementioned advantages of producing the necessary amount of underwater illumination in a swimming pool without the glare heretofore present, and of providing a low voltage system that eliminates the safety hazards heretofore prevalent in swimming pool lighting systems, my invention is remarkably easy to install and service. The original installation can be accomplished with a minimum of labor and expense since the cavity required is small and easily formed. Moreover, when the mounting frame 16 is in place and the electrical conduit 14 has been provided into the cavity 13, the lighting fixture 10 can be installed or removed for servicing quickly with complete safety even though the pool is filled with water above the cavity. In installing the fixture the cover 25 is removed from the housing 20 and the end of the conduit 14 is brought through the opening 31 in the boss 30. The end contacts on the wires 15 are attached to the terminals provided by the screws 49 and nuts 50 and are secured by the nuts 51. The rear of the housing 20 is then sealed around the conduit by screwing the nut 73 tightly on the boss 30 thus pressing the bushing 71 snugly around the conduit 14. The reflectors 22 and 23 can now be secured by the screws 38 and 40 and the bulb 21 is inserted by means of its contacts 55 into the clips 45. The cover 25 is now secured by the screws 65 to the housing 20 so that the lens 24 and its gasket 60 are sealed in position around the housing mouth. With the housing completely sealed, no water can enter it to contact the bulb 21 and the wire contacts. The assembled cover plate and housing may now be attached to the studs of the mounting assembly and secured by locking nuts 19.

The bulb 21, as stated previously, provides a very high degree of light intensity because of the inherent efficiency of the tungsten filament, quartz bulb. Normally, to confine a bulb using this amount of power within an enclosed housing would entail serious heat problems, however, with my invention the housing and the bulb within are constantly cooled by the circulation of water through the ports 64 and 67 and through the cavity 13 around the housing. This is an important feature of my invention because it prevents any overheating of the fixture 10 even over long periods of constant use.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An underwater lighting fixture adapted for installation in a cavity formed in the wall of a swimming pool and supplied with electrical power by means of a conduit extending into the cavity, said fixture comprising:
   an integral housing member having an open front surrounded by a flange and a rear opening for receiving said electrical conduit;
   a socket plate fixed to the rear inside wall of said housing;
   a first reflector member fixed to said socket plate;
   a pair of second reflector members attached to the side walls of said housing and to said first reflector member;
   a light bulb adapted to produce a high intensity light at low voltage;
   clip means attached to said socket plate for removably retaining said light bulb in a fixed predetermined position adjacent said reflector means, said light bulb having contact means extending through openings in said first reflector member to engage said clip means;
   said clip means including contact means within said housing adapted to connect with wires of said electrical conduit;
   means in said rear opening for providing a fluid tight seal around the electrical supply conduit extending into said housing;
   a transparent lens member covering the open side of said housing;
   a cover frame member having an opening, and horizontal light deflecting louvers across said opening adapted to obscure the light bulb filament from view from a position above the water level of the pool;
   means for securing said cover member to said housing and
   gasket means for sealing said lens member to said housing around its edges, thereby making the housing fluid tight;
   and means for attaching said cover frame member to opposite sides of the cavity in the swimming pool wall located below its normal water line so that it supports said housing within said cavity, said cover frame member having a series of spaced apart ports for circulating cooling water from the swimming pool through said cavity and completely around said housing.

2. An underwater lighting fixture adapted for installation in a cavity formed in the wall of a swimming pool and supplied with electrical power by means of a conduit extending into the cavity, said fixture comprising:
   an integral housing member having an open front surrounded by a flange and a fluid tight rear opening for receiving said electrical conduit;
   a socket plate fixed to the rear inside wall of said housing;
   a first curved reflector member fixed to said socket plate;
   a pair of second reflector members attached to the side walls of said housing and to said first reflector member;
   a light bulb adapted to produce a high intensity light at low voltage;
   clip means attached to said socket plate for removably retaining said light bulb adjacent said reflector means, said light bulb having contact means extending through spaced apart openings in said first reflector member to engage said clip means;
   said clip means including locking detents and guiding tabs for retaining said bulb in a fixed predetermined position relative to said first reflector member;
   said clip means further including terminal means adapted to connect with wires of said electrical conduit;
   means in said rear opening for providing a fluid tight seal around the electrical supply conduit extending into said housing;

a transparent lens member covering the open side of said housing;

a cover frame member having an opening and attached to the flange of said housing;

horizontal light deflecting louvers across said opening adapted to obscure the light bulb filament from view from a position above the water level of the pool;

means for sealing said lens member to said housing around its edges, thereby making the housing fluid tight;

and means for attaching said cover frame member to opposite sides of the cavity in the swimming pool wall located below its normal water line so that it supports said housing within said cavity, said cover frame member in said housing flange having a series of spaced apart ports for circulating cooling water from the swimming pool through said cavity and completely around said housing therein.

References Cited by the Examiner
UNITED STATES PATENTS

| | | | |
|---|---|---|---|
| 1,749,729 | 3/30 | Zigler | 240—46.31 |
| 1,788,509 | 1/31 | Everson | 240—26 X |
| 1,792,398 | 2/31 | Rothen | 240—26 |
| 2,048,491 | 7/36 | Cartun | 313—318 X |
| 2,211,605 | 8/40 | Moehler | 313—318 X |
| 2,935,601 | 5/60 | Steiner et al. | 240—26 |
| 3,021,422 | 2/62 | Ogier et al. | 240—11.4 X |
| 3,097,903 | 7/63 | Moore | 240—11.4 X |

NORTON ANSHER, *Primary Examiner.*

JOSEPH D. BEIN, *Examiner.*